Jan. 27, 1925.
L. E. POLICAN
TROWEL
Filed April 25, 1924
1,524,633
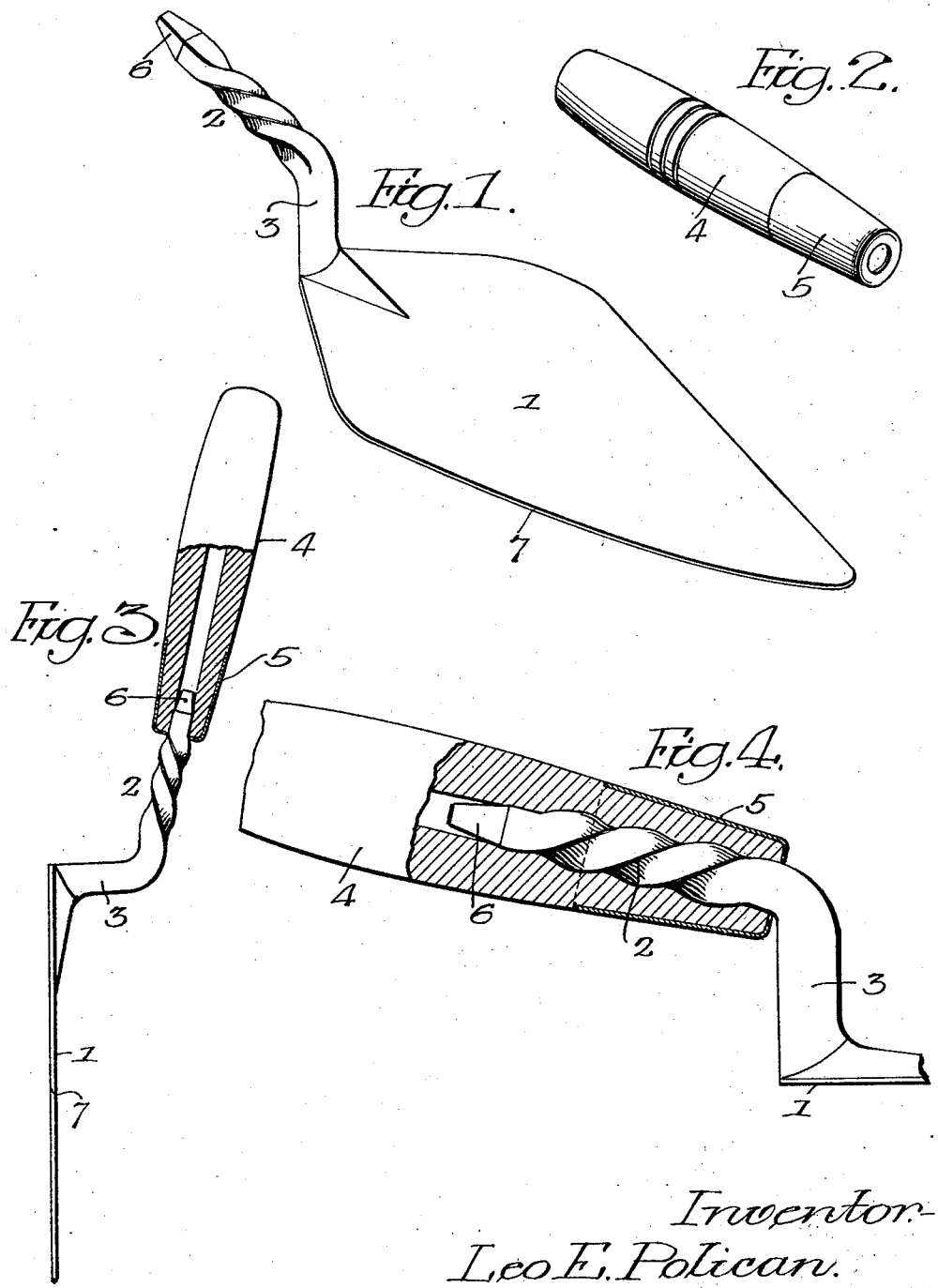
Inventor-
Leo E. Polican.
by his Attorneys.

Patented Jan. 27, 1925.

1,524,633

UNITED STATES PATENT OFFICE.

LEO E. POLICAN, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

TROWEL.

Application filed April 25, 1924. Serial No. 709,002.

*To all whom it may concern:*

Be it known that I, LEO E. POLICAN, a citizen of the United States, residing in Philadelphia, Pennsylvania, have invented certain Improvements in Trowels, of which the following is a specification.

My invention relates to certain improvements in means for attaching a handle to the tang of a mason's trowel, and other tools.

One object of the invention is to provide means for firmly attaching the handle to a trowel.

A further object of the invention is to design the fastening means so that when the trowel is used for cutting bricks, the impact will tend to tighten the tang in the handle.

A still further object of the invention is to design the tang so that the handle can be driven into the trowel.

In the accompanying drawings:

Fig. 1 is a perspective view of my improved trowel, without the handle;

Fig. 2 is a perspective view of the handle;

Fig. 3 is a view showing the handle partly driven into the tang of the trowel; and Fig. 4 is a side view, partly in section, showing the handle in position on the tang of the trowel.

The body 1 of my improved mason's trowel has a tang 2, which is connected to the body by an angular neck 3. The handle 4 has a ferrule 5 and has a cylindrical hole bored into one end to receive the tang 2 of the trowel. The tang 2 is made of square stock in the present instance, which is twisted so that the corners become elongated, curved ribs of such a pitch that, when the handle 4 is placed in position, as in Fig. 3, with the squared end of the tang extending in the circular hole and heavy pressure is applied by a press, the handle will turn on the tang, as it is forced thereover. When the handle is driven to its full extent, as in Fig. 4, the wood of the handle will bind upon the ribbed tang and will hold the handle firmly to the trowel.

The twist made in the tang is a left hand twist so that, when the edge 7 of the trowel, which is a right hand trowel, is used to cut bricks, &c., the impact on the brick tends to cause the tang to turn in the handle, thereby tightening it therein.

In making left hand trowels, the twist in the tang is a right hand twist.

I claim:

1. The combination of a trowel having a blade with a cutting edge at one side and having a tang on a different plane from the blade, said tang having a twist; and a handle driven on the tang, the twist in the tang being in a direction that causes the tang to turn in the handle and tighten it therein, when the cutting edge strikes a brick.

2. The combination of a trowel having a blade and a tang on a different plane from the blade, said tang having a left hand twist; and a handle driven on the tang.

LEO E. POLICAN.